United States Patent [19]

Li et al.

[11] Patent Number: 5,998,546

[45] Date of Patent: Dec. 7, 1999

[54] RESINOUS COMPOSITION WITH PERMANENT ANTI-STATIC PROPERTIES

[75] Inventors: Kuo-Chen Li, Taipei; Jui-Ming Ni, Hsinchu Hsien; Tsai-Wie Tseng, Hsinchu Hsien; Jen-Lien Lin, Hsinchu Hsien, all of Taiwan

[73] Assignee: Industrial Technology Research Institute, Hsinchu, Taiwan

[21] Appl. No.: 08/833,596

[22] Filed: Apr. 7, 1997

[30] Foreign Application Priority Data

Feb. 21, 1997 [TW] Taiwan ................................. 86102108

[51] Int. Cl.⁶ ............................ C08L 29/10; C08L 23/26; C08L 35/06
[52] U.S. Cl. ......................... 525/231; 525/192; 525/196; 525/238; 525/239; 525/241; 525/369
[58] Field of Search ..................................... 525/231, 192, 525/196, 369, 238

[56] References Cited

U.S. PATENT DOCUMENTS 4,543,390  9/1985  Tanaka et al. ............................ 525/63

*Primary Examiner*—Fred Zitomer
*Attorney, Agent, or Firm*—Sughrue, Mion, Zinn, Macpeak & Seas, PLLC

[57] ABSTRACT

An anti-static resinous composition with permanent anti-static property is provided. The anti-static resinous composition comprises from 5 to 50 percent by weight of hydrophilic copolymer and from 50 to 95 percent by weight of thermoplastic. The hydrophilic copolymer is formed by self-emulsion polymerization. The monomer mixture used in the reaction comprises from 10 to 70 percent by weight of vinyl or propenyl macromonomer containing a polyethylene oxide chain and from 30 to 90 percent by weight of ordinary vinyl monomer. The thermoplastic is compatible with the hydrophilic copolymer. The resultant resinous composition has permanent anti-static properties.

16 Claims, No Drawings

RESINOUS COMPOSITION WITH PERMANENT ANTI-STATIC PROPERTIES

BACKGROUND OF THE INVENTION

1. Field of the Invention

This invention relates to resinous compositions, and more particularly, to an anti-static resinous composition which has a permanent anti-static property for preventing the resultant plastics from accumulating electrostatic charges thereon. Still more specifically, the anti-static resinous composition of the invention comprises a hydrophilic copolymer which has good heat-stability when mixed with thermoplastic under high temperature process conditions. Further, the hydrophilic copolymer can be compatibly mixed with the thermoplastic without the need to add any compatible agents thereto. The anti-static resinous composition is formed by mixing the hydrophilic copolymer with the thermoplastic at various ratios. The plastic articles formed from the anti-static resinous composition of the invention possesses excellent permanent anti-static property and will not suffer from disintegration or blooming.

2. Description of Related Art

Thermoplastics are widely utilized in the industry for making various kinds of plastics product with excellent insulation and medical properties such as high modulus, high impact resistance etc. They can be made by various processes such as extruding, rolling, injection and heat-formation.

One drawback to the thermoplastics, however, is that, due to their insulating quality, static electricity easily accumulates on the plastic articles made therefrom, which can cause electro-static damage to the related circuit parts in, for example, copy machines, faxes, printers, to name just a few, that are enclosed in plastic casings. Moreover, dust can be easily attracted by the static electricity and accumulate on the plastic casings or covers of these office machines. In printing factories, for instances, the static electricity on the plastic parts of a high-speed printing machines can cause the paper sheets passing therethrough at high speeds to be attracted astray, usually causing the so-called paper path jam in the machine. In a winding machine for tapes made of plastics, for instances, the static electricity produced due to the high-speed winding of the tapes, when accumulated to a certain great amount, can cause a sudden electric-static discharge in the form of an electric arc, which could then cause electrical shock to the operating personnel or damage to the machines.

In the semiconductor industry, the transistor elements on IC chips, due to their extremely small sizes, are very sensitive to the static electricity accumulated on the plastic packages. A static charge with a potential in the range of 50 to 300 V (volt) can cause severe damage to the transistor elements in the ICs. A human body carries an average of 1 to 2 kV (kilovolt) of static electricity. When touching the ICs by hand, the static electricity on the human body can cause damage to the transistor elements therein. Therefore, during the manufacture and transportation of the ICs, they should be put in containers made of anti-static materials.

Several solutions have been proposed to prevent the electrostatic damage. The first solution is to coat a layer of anti-static material on the surfaces of the plastics by, for example, a dipping, wiping, or spraying process. The anti-static material is usually a moisture-absorbing interfacial agent which can prevent the accumulation of static electricity on the coated plastics. One drawback to this kind of anti-static material is that the anti-static effect thereof decreases as the ambient humidity decreases. Moreover, the coating of this anti-static material can easily peel off the surfaces of the plastics. For a circuit enclosed by a plastic casing, this could result in the undesired consequence of contaminating the circuit elements enclosed therein. Should the coating of the anti-static material peel off, the plastic casing must be surface treated again so as to form a new coating of the anti-static material thereon.

The second solution for enhanced anti-static effect is to mix the thermoplastic with a low molecular weight anti-static agent in the process of making the plastics. The molecules of this anti-static agent can migrate to the surface of the plastics and attract the moisture molecules from the ambient atmosphere to form a thin water film on the surface of the plastics. This thin water film can prevent the buildup of static electricity on the surface of the plastics. Various compounds have been proposed to serve as this kind of anti-static agent, as the N-oxyethylated alkylamines disclosed in U.S. Pat. No. 3,575,903; the alkanolamines and polyalkylene glycols disclosed in U.S. Pat. No. 3,525,915; and the lauric diethanolamide disclosed in U.S. Pat. No. 3,873,645. One major drawback to these anti-static agents, however, is that, the ingredients thereof could filtrate out to the surface of the finished plastic articles, thus causing the undesired effect of blooming on the same. Moreover, after a long period of use, the anti-static effect may decrease.

The third solution for enhanced anti-static effect is to add a high molecular weight anti-static agent in the process of making the plastics. This kind of anti-static agent can allow the plastics to have a permanent anti-static effect and is classified in terms of its compatibility with the thermoplastic into two types. The first type has less compatibility with the thermoplastic while the second type has more compatibility.

The first type of the anti-static agent, when mixed with the thermoplastic, enrich a highly dense continuous phase on the surface of the plastics, allowing the anti-static agent to exhibit enhanced anti-static effect on the same. Various compounds have been proposed to serve as this kind of anti-static agent, as the polyether ester amide disclosed in U.S. Pat. No. 5,338,795 and Japan Patent Heisei-4,337,344; and the epichlorohydrincopolyer disclosed in U.S. Pat. Nos. 4,588,733, No. 4,775,716, No. 4,857,590, and No. 5,216,046. To achieve the highly dense continuous phase on the surface of the plastics, however, a suitable compatible agent must be added to the mixture of the anti-static agent and the thermoplastic. Without the adding of the compatible agent, the thermoplastic will lose its characteristics.

The second type of the foregoing anti-static agent is formed by copolymerization of a vinyl monomer containing polyethylene oxide chains with an ordinary vinyl monomer. When mixed with thermoplastic, the vinyl monomer ingredient in the anti-static agent provides compatibility, while the polyethylene oxide ingredient provides the desired anti-static effect. Since this type of anti-static agent has more compatibility with the thermoplastic, it can exhibit a continuous phase on the surfaces of the plastics, allowing the anti-static agent to provide a permanent anti-static effect and excellent mechanical properties. The copolymerization is customarily an emulsion polymerization process, which allows the anti-static agent to possess the qualities of high impact-resistant capability and matting. Various compounds have been proposed to serve as this kind of anti-static agent, as U.S. Pat. No. 4,543,390; Japan Patents Showa-60 144,314; Showa-60 195,143; Showa-61 261,344; Showa-62 48,756; and Heisei-1 126,358.

From the foregoing, it is apparent without question that the permanent anti-static agent will be a key player in the future of plastic applications. However, although the high molecular weight copolymers such as polyether ester amide, epichlorohydrin copolymer, and high-molecule-weight polyethylene oxide (high M.W. PEO), are effective permanent anti-static agents, they exhibit some drawbacks when mixed with the thermoplastic. For instance, compatible agents should be added to some of the anti-static agents to preserve the mechanical properties of the resultant plastics. Some of the anti-static agents require the addition of alkaline salts, interfacial agents, or other additives to help them exhibit the anti-static property. When interfacial agents are added, the processability of the resultant plastics will be limited. The anti-static agents made by emulsion polymerization can be provided with backbones that are compatible with the thermoplastic and provide side chains that have anti-static property, so that, when they are mixed with the thermoplastic, no compatible agents are required while nonetheless providing excellent anti-static properties. One drawback to these anti-static agents, however, is that, since they are made by emulsion polymerization, the emulsifying agent will be left as a residue therein during separation, purification, or mixing processes. The residue of the emulsifying agent will cause the resultant plastics to have poor appearance. In addition, the residue on the surface of the resultant plastics causes the resultant plastics to have poor post-processability.

SUMMARY OF THE INVENTION

It is therefore a primary objective of the present invention to provide an anti-static resinous composition which has improved processability and post-processability.

It is another objective of the present invention to provide an anti-static resinous composition which has high molecular weight.

It is still another objective of the present invention to provide an anti-static resinous composition which can be made without leaving the residue of interfacial agent thereon.

It is yet another objective of the present invention to provide an anti-static resinous composition which has good compatibility with thermoplastic.

In accordance with the foregoing and other objectives of the present invention, a new anti-static resinous composition is provided. This anti-static resinous composition can be prepared by a self-emulsion polymerization process so that no residue of the interfacial agent will be left thereon. Moreover, the anti-static resinous composition has a permanent anti-static property and excellent mechanical properties.

The anti-static resinous composition of the invention comprises (a) about 5 to 50 parts by weight of a hydrophilic copolymer, and (b) about 50 to 95 parts by weight of a thermoplastic.

The hydrophilic copolymer comprises an alkaline hydroxide and a monomer mixture. The monomer mixture includes from 10 to 70 percent by weight of a macromolecule monomer.

The macromolecule monomer is represented by the formula

$R_1CH=CHR_2O(C_2H_4O)_nR_3$ wherein $R^1$ denotes a radical selected from the group consisting of methyl and hydrogen atom;

$R_2$ denotes a radical selected from the group consisting of polypropylene oxide chain, alkyl chain, and alkyl chain containing a benzene ring;

$R_3$ denotes a radical selected from the group consisting of methyl, hydrogen, and ammonium sulfonate; and n is an integer selected from 5 to 50.

DETAILED DESCRIPTION OF PREFERRED EMBODIMENTS

The hydrophilic copolymer used in the anti-static resinous composition of the invention for providing the desired anti-static property can be formed through a self-emulsion polymerization process or an ordinary emulsion polymerization process. A key factor for the self-emulsion polymerization process is to select a suitable macromolecule monomer having interfacial activity (or a reactive interfacial agent) for copolymerization with other monomers. The conditions for the self-emulsion polymerization process are substantially identical to those for the ordinary emulsion polymerization process, except that in the self-emulsion polymerization process, no additional emulsifying agent is required to maintain the stability of the polymer particles. The hydrophilic copolymer prepared by the self-emulsion polymerization process includes no interfacial agent sticking thereon. For this reason, there is no need to worry about the existence of any interfacial agent during the drying and pelletization processes. Therefore, the molded articles made of a blend of the hydrophilic copolymer and a thermoplastic do not have a degraded surface finish or poor post-processability.

The hydrophilic copolymer used in the anti-static resinous composition of the invention is formed by copolymerization of at least one interfacially-active macromolecule monomer containing vinyl or propenyl radicals and at least one ordinary vinyl monomer. The interfacially-active macromolecule containing vinyl or propenyl radicals comprises (a) a lipophilic radical containing a vinyl or propenyl radical having a chain selected from the group consisting of a polypropylene oxide chain, alkyl chain, and an alkyl chain containing benzene ring, and (b) a hydrophilic radical containing a polyethylene oxide chain. When this monomer, which contains both lipophilic and hydrophilic radicals, undergoes an emulsion copolymerization process with an ordinary vinyl monomer, no emulsifying agent is required to maintain the stability of the emulsion. The so-called ordinary vinyl monomer comprises one or more monomers selected from the group consisting of aromatic vinyl monomers, methacrylate ester monomers, acrylate ester monomers, and vinyl cyanide monomers. The choice of the monomers is based on the compatibility of the resultant hydrophilic copolymer with the matrix of the thermoplastic that is to be mixed with the hydrophilic copolymer.

The backbone of the hydrophilic copolymer used in the anti-static resinous composition of the invention comprises (a) at least one monomer selected from the group consisting of aromatic vinyl monomers, methacrylate ester monomers, acrylate ester monomers, and vinyl cyanide monomers, and (b) a lipophilic radical of a macromolecule monomer containing both a lipophilic radical and a hydrophilic radical. The side chain of the hydrophilic copolymer comprises macromolecule monomer polyethyleneoxide chains.

When the hydrophilic copolymer is mixed with a thermoplastic, the backbone of the hydrophilic copolymer has good compatibility with the matrix of the thermoplastic, while the polyethylene oxide chain in the side chain provides the desired anti-static property. Since the polyethylene oxide chain is combined with the copolymer through chemical bonds, the resultant resinous composition has very good mechanical properties. Also, the resultant plastics made from the resinous composition will not suffer from disintegration and blooming. This allows the anti-static property of the resinous composition of the invention to not be degraded or even lost after washing or rubbing the plastic articles with water or soaked cloth. Therefore, the resinous composition of the invention possesses a permanent anti-static property.

The anti-static resinous composition of the invention comprises (a) from 5 to 50 parts by weight of hydrophilic copolymer, and (b) from 50 to 95 parts by weight of thermo-plastic. The hydrophilic copolymer, which provides the desired anti-static property, is prepared by a self-emulsion polymerization process performed at a temperature of about 30 to 80° C. The initiating agent for the self-emulsion polymerization process is any chemical compound that can release free radicals when mixed with an aqueous solution, such as potassium persulfate, sodium persulfate, ammoniumpersulfate, benzoyl peroxide, azobisisobutyrnitrile, and so on. The monomer mixture used in the self-emulsion polymerization process comprises at least one macromolecule monomer containing vinyl or propenyl radicals and at least one ordinary vinyl monomer. The ratio of the macromolecule monomer in the monomer mixture is preferably from 5 to 80 percent by weight, and more preferably 10 to 70 percent by weight. If the amount of the macromolecule monomer is insufficient, the anti-static property of the hydrophilic copolymer will be degraded; while if excessive, the manufacturing process will be uncompetitively costly.

The macromolecule monomer is represented by the following general formula:

$$R_1CH\!\!=\!\!CHR_2O(C_2H_4O)_nR_3$$

wherein $R_1$ denotes a radical selected from the group consisting of methyl and hydrogen atom;

$R_2$ denotes a radical selected from the group consisting of a polypropylene oxide chain, alkyl chain, and alkyl chain containing a benzene ring;

$R_3$ denotes a radical selected from the group consisting of methyl, hydrogen atom, and ammonium sulfonate; and n is an integer selected from 5 to 50.

If $R_3$ is ammonium sulfonate, the macromolecule monomer will have anionic inter-facial activity; while if $R_3$ is a methyl radical or a hydrogen atom, the macromolecule monomer will have non-ionic interfacial activity. The HLB (hydrophilic-lipophilic balance) value of the macromolecule monomer is preferably in the range of 9 to 18. If the HLB value is too low, the self-emulsion polymerization will be inferior; while if too high, the manufacturing process will be uncompetitively costly. The higher the HLB value, the better is the result of the self-emulsion polymerization process, but with an increased manufacturing cost, however. The optimal HLB value is 16.

The integer n is an integer preferably selected from 5 to 50, more preferably from 10 to 40, and most preferably 30. If the repeating unit of the ethylene oxide in the polyethylene oxide chain is excessive in number, the monomer mixture will become viscous, which can make the reaction difficult to proceed; while if insufficient in number, the macromolecule monomer will have a low interfacial activity, which will cause the resultant hydrophilic copolymer from the self-emulsion polymerization to have weak anti-static property, or even make the self-emulsion polymerization unable to proceed.

As mentioned earlier, the hydrophilic copolymer used in the anti-static resinous composition of the invention is prepared by self-emulsion polymerization of a monomer mixture composed of at least one macromolecule monomer containing vinyl or propenyl radicals and at least one ordinary vinyl monomer. The monomer mixture contains preferably from 20 to 95 percent by weight of the ordinary vinyl monomer, and more preferably from 30 to 90 percent by weight of the ordinary vinyl monomer. If the amount of the ordinary vinyl monomer is excessive, the resultant resinous composition will have no anti-static property; while if insufficient, the manufacturing process will be uncompetitively costly. The ordinary vinyl monomer is any chemical compound that can undergo an emulsion copolymerization process with the macromolecule monomer containing vinyl or propenyl radicals.

The aromatic vinyl monomer is selected from the group consisting of styrene and α-methylstyrene; most preferably styrene. The methacrylate ester monomer is selected from the group consisting of methyl methacrylate, 2-hydroxy ethyl methacrylate, butyl methacrylate, allyl methacrylate, and glycidyl methacrylate; most preferably methyl methacrylate. The acrylate ester monomer is selected from the group consisting of methyl acrylate, butyl acrylate, ethyl acrylate, and 2-hydroxy ethyl acrylate; most preferably methyl acrylate. The vinyl cyanide monomer is preferably acrylonitrile.

The ordinary vinyl monomer in the monomer mixture is preferably composed of from 50 to 100 percent by weight of aromatic vinyl monomer, methacrylate ester monomer, acrylate ester monomer, and from 0 to 50 percent by weight of vinyl cyanide monomers. The adding of the monomer mixture can be performed in a batch, continuous, or multi-stage continuous manner. The multi-stage continuous manner is most preferable.

As mentioned earlier, the hydrophilic copolymer that gives the resinous composition of the invention its anti-static property is prepared by an emulsion polymerization process. In this process, the additives should include at least from 0.01 to 2 parts by weight of alkaline hydroxide, and more preferably from 0.05 to 1 parts by weight. If the amount of the alkaline hydroxide is insufficient, it will contribute not much to the antistatic properties of the resultant hydrophilic copolymer; while if excessive, the resultant plastics will have poor appearance.

The thermoplastic used in the anti-static resinous composition of the invention should be compatible with the hydrophilic copolymer. It can be selected from the group consisting of acrylonitrile-butadiene-styrene terpolymer (ABS), polyvinylchloride (PVC), high-impact polystyrene (HIPS), MBS, SAN, PMMA, and so on.

The anti-static resinous composition of the invention comprises from 5 to 50 parts by weight of hydrophilic copolymer and from 50 to 95 parts by weight of thermoplastic; more preferably, from 10 to 40 parts by weight of hydrophilic copolymer and from 60 to 90 parts by weight of thermoplastic. This ratio range gives the resinous composition very good anti-static and mechanical properties.

The ingredients of the anti-static resinous composition of the invention can be mixed by first pre-mixing latex-formed hydrophilic copolymer with the thermoplastic, then drying the mixture, and finally, processing the mixture by an extruder for pelletization of the mixture. Alternatively, the mixing process can be performed by first drying the latex-formed hydrophilic copolymer, then pulverizing the dried hydrophilic copolymer, subsequently mixing the powder with particulate thermoplastic, and finally processing the mixture by an extruder for pelletization of the mixture. Furthermore, the mixing process can also be performed by using a Banbury mixer.

During the mixing process, no compatible agent is needed. However, in consideration of the processability and physical properties of the resultant resinous composition, suitable additives can be added, such as anti-oxidants, heat-stability agents, processing aiding agents, fire retardants, impact-resistance modifying agents, and so on.

EXAMPLES

The invention can be more fully understood by referring to the following examples and the associated tables, wherein:

Table 1 shows the composition of various samples of the monomer mixture;

Table 2 shows the electrical characteristic of various samples of the anti-static resinous composition of the invention which are prepared by using an ABS resin; and Table 3 shows the electrical characteristic of various samples of the anti-static resinous composition of the invention which are prepared by using various kinds of thermoplastics.

The following Table 1 shows seven test samples $A_1$ to $A_7$ and two comparative samples $A_8$ to $A_9$ of monomer mixture that are prepared with different kinds of alkaline hydroxides for self-emulsion copolymerization.

TABLE 1

|  | Test Samples | | | | | | | Comparative Samples | |
|---|---|---|---|---|---|---|---|---|---|
|  | $A_1$ | $A_2$ | $A_3$ | $A_4$ | $A_5$ | $A_6$ | $A_7$ | $A_8$ | $A_9$ |
| SM*1 | 52 | 45 | 52 | 45 | 37.5 | 52 | 52 | 52 | 52 |
| AN*2 | 18 | 15 | 18 | 15 | 12.5 | 18 | 18 | 18 | 18 |
| M-20*3 | 30 | 40 | — | — | — | — | — | 30 | — |
| M-30*4 | — | — | 30 | 40 | 50 | 30 | 30 | — | 30 |
| NaOH | 0.1 | 0.1 | 0.12 | 0.16 | 0.20 | — | — | — | — |
| LiOH | — | — | — | — | — | 0.2 | — | — | — |
| KOH | — | — | — | — | — | — | 0.3 | — | — |

Note:
[1]SM stands for styrene
[2]AN stands for acrylonitrile
[3]M-20 stands for a macromolecule monomer with a repeating unit of 20 ethyleneoxide radicals.
[4]M-30 stands for a macromolecule monomer with a repeating unit of 30 ethyleneoxide radicals.

Seven samples of hydrophilic copolymer are obtained from the seven test samples $A_1$ to $A_7$ by the steps:

(1) preparing a precharge solution composed of 130 parts by weight of pure water, 0.3 parts by weight of sodium bicarbonate ($NaHCO_3$), and some alkaline hydroxide;

(2) containing the precharge solution in a reaction bottle having four inlets, then stirring the precharge solution while introducing nitrogen thereinto at a temperature of about 60° C.;

(3) adding the seven test samples of monomer mixture solutions listed in Table 1 respectively in two stages to the precharge solution;

in the first stage, pouring 20% of the monomer mixture into the reaction bottle, stirring the solution in the reaction bottle continuously for 10 minutes, and then adding 0.1 parts by weight of potassium persulfate ($K_2S_2O_8$) to the bottle for the first-stage reaction;

(4) After about 60 minutes, performing the second-stage reaction in which the remaining 80% of the monomer mixture is added to the solution in the reaction bottle continuously for about 2 hours while at the same adding 0.4 parts by weight of potassium persulfate ($K_2S_2O_8$). After the 2-hour reaction, seven samples of latex-formed hydrophilic copolymer are obtained and then processed by a drying process to obtain dried samples.

On the other hand, two comparative samples of the hydrophilic copolymer are obtained by substantially the same processes for obtaining the foregoing samples, except that here the process of adding the alkaline hydroxide is eliminated.

The process for forming the anti-static resinous composition of the invention is first to mix a thermoplastic, such as the ABS resin, with the hydrophilic copolymer by a double-helical extruder at a temperature of about 180° C., then press the mixture by a pressing machine to form a thin-film sample with a thickness of about 3 mm (millimeter), and finally place the thin-film sample in an environment with a temperature of about 23° C. and a relative humidity level of 50% RH for a continuous period of 48 hours. After that, the electrical resistance of the thin-film sample is measured. The results are shown in the following Table 2.

TABLE 2

|  |  | ABS* Resin (%) | Hydrophilic Copolymer (%) | $\Omega/\square$ (50% RH) |
|---|---|---|---|---|
| Test Samples | 1 | 70 | 30 (A1) | $2 \times 10^{12}$ |
|  | 2 | 70 | 30 (A2) | $4 \times 10^{10}$ |
|  | 3 | 70 | 30 (A3) | $3 \times 10^{11}$ |
|  | 4 | 85 | 15 (A4) | $9 \times 10^{10}$ |
|  | 5 | 90 | 10 (A5) | $2 \times 10^{11}$ |
|  | 6 | 85 | 15 (A5) | $7 \times 10^{9}$ |
|  | 7 | 70 | 30 (A6) | $8 \times 10^{11}$ |
|  | 8 | 70 | 30 (A7) | $5 \times 10^{11}$ |
| comparative samples | 9 | 70 | 30 (A8) | $>10^{13}$ |
|  | 10 | 70 | 30 (A9) | $>10^{13}$ |

Note: *The 525#ABS resin of Great Eastern Resins Industrial Corporation, Taiwan, ROC.

When different kinds of thermoplastics are used instead of the foregoing one while all the other conditions are the same as foregoing, the results are shown in the following Table 3.

TABLE 3

|  |  | Thermoplastic (%) | Hydrophilic Copolymer (%) | $\Omega/\square$ (50% RH) |
|---|---|---|---|---|
| Test Samples | 11 | 85 (ABS[1]) | 15 (A4) | $2 \times 10^{11}$ |
|  | 12 | 85 (ABS[2]) | 15 (A4) | $8 \times 10^{11}$ |
|  | 13 | 85 (HIPS[3]) | 15 (A4) | $4 \times 10^{10}$ |
|  | 14 | 85 (PVC[4]) | 15 (A4) | $5 \times 10^{10}$ |

Note:
[1]. The 757#ABS of Chi-Mei Corporation, Taiwan, ROC.
[2]. The D150#ABS of Grand Pacific Petrochemical Corporation, Taiwan, ROC.
[3]. The HIPS of USI Far East Corporation, Taiwan, ROC.
[4]. The H-66#PVC of China General Plastics Corporation, Taiwan, ROC.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An anti-static resinous composition, comprising a hydrophilic copolymer and a thermoplastic, wherein
said hydrophilic copolymer is composed of an alkaline hydroxide and a monomer unit mixture, said monomer mixture including from 10 to 70 percent by weight of a macromolecule monomer which is represented by the formula $$R_1CH=CHR_2O(C_2H_4O)_nR_3$$

wherein

R$_1$ denotes a first member selected from the group consisting of a methyl group and a hydrogen atom;

R$_2$ denotes a second member selected from the group consisting of a polypropylene oxide chain, an alkyl chain, and an alkyl chain containing a benzene ring;

R$_3$ denotes a third member selected from the group consisting of a methyl group, a hydrogen atom, and an ammonium sulfonate group; and n is an integer selected from 5 to 50, and wherein the macromolecule monomer has a hydrophilic lipophilic balance value of between 9 and 18.

2. The anti-static resinous composition of claim 1, comprising from 5 to 50 parts by weight of hydrophilic copolymer and from 50 to 95 parts by weight of thermoplastic.

3. The anti-static resinous composition of claim 1, wherein said hydrophilic copolymer is formed by emulsion polymerization of the macromolecule monomer, the monomer unit mixture, and the alkaline hydroxide.

4. The anti-static resinous composition of claim 3, wherein said emulsion polymerization is a self-emulsion polymerization process.

5. The anti-static resinous composition of claim 1, wherein said thermoplastic is selected from the group consisting of acrylonitrile-butadiene-styrene terpolymer, polyvinylchloride, and high-impact polystyrene.

6. The anti-static resinous composition of claim 1, wherein said macromolecule monomer includes a lipophilic group and a hydrophilic group.

7. The anti-static resinous composition of claim 6, wherein said lipophilic group is selected from the group consisting of a polypropylene oxide chain an, alkyl chain, and an alkyl chain containing a benzene ring.

8. The anti-static resinous composition of claim 6, wherein said hydrophilic group is a polyethylene oxide chain.

9. The anti-static resinous composition of claim 8, wherein said polyethylene oxide chain contains a repeating unit of from 5 to 50 ethylene oxide radicals.

10. The anti-static resinous composition of claim 1, wherein said monomer unit mixture contains at least one monomer selected from the group consisting of an aromatic vinyl monomer, an methacrylate ester monomer, an acrylate ester monomers, and a vinyl cyanide monomer.

11. The anti-static resinous composition of claim 10, wherein said aromatic vinyl monomer unit is a styrene unit.

12. The anti-static resinous composition of claim 10, wherein said methacrylate ester monomer unit is a methyl methacrylate unit.

13. The anti-static resinous composition of claim 10, wherein said acrylate ester monomer unit is a methyl acrylate unit.

14. The anti-static resinous composition of claim 10, wherein said vinyl cyanide monomer unit is an acrylonitrile unit.

15. The anti-static resinous composition of claim 3, comprising from 0.01 to 1 parts by weight of alkaline hydroxide.

16. The anti-static resinous composition of claim 3, wherein said alkaline hydroxide is selected from the group consisting of sodium hydroxide, lithium hydroxide, and potassium hydroxide.

* * * * *